(12) United States Patent
Tewksbary

(10) Patent No.: US 6,934,709 B2
(45) Date of Patent: Aug. 23, 2005

(54) INTERFACE DEFINITION LANGUAGE COMPILER

(75) Inventor: David Tewksbary, Hudson, NH (US)

(73) Assignee: MatrixOne, Inc., Chelmsford, MA (US)

( * ) Notice: Subject to any disclaimer, the term of this patent is extended or adjusted under 35 U.S.C. 154(b) by 656 days.

(21) Appl. No.: 09/877,416

(22) Filed: Jun. 8, 2001

(65) Prior Publication Data

US 2004/0015898 A1 Jan. 22, 2004

Related U.S. Application Data

(60) Provisional application No. 60/278,812, filed on Mar. 26, 2001.

(51) Int. Cl.$^7$ ............................................... G06F 17/30
(52) U.S. Cl. ..................................... 707/10; 707/103 R
(58) Field of Search ............................. 707/2, 10, 100, 707/101, 103 R, 104.1; 345/764; 709/201, 203, 217, 218, 219; 717/102, 104, 108, 164; 719/328

(56) References Cited

U.S. PATENT DOCUMENTS

| | | | |
|---|---|---|---|
| 5,586,323 A | 12/1996 | Koizumi et al. ............. 717/174 |
| 5,598,560 A | 1/1997 | Benson ........................ 717/159 |
| 5,694,605 A | 12/1997 | Miyaji et al. ................ 717/153 |
| 5,768,564 A | 6/1998 | Andrews et al. ............. 717/137 |
| 5,842,017 A | 11/1998 | Hookway et al. ........... 717/158 |
| 5,842,204 A | 11/1998 | Andrews et al. ................. 707/3 |
| 5,875,336 A | 2/1999 | Dickol et al. ............... 717/143 |
| 6,021,275 A | 2/2000 | Horwat ........................ 717/159 |
| 6,031,993 A | 2/2000 | Andrews et al. ............. 717/143 |
| 6,091,897 A | 7/2000 | Yates et al. .................. 717/138 |
| 6,199,095 B1 | 3/2001 | Robinson ..................... 718/107 |
| 6,199,195 B1 * | 3/2001 | Goodwin et al. ............ 717/104 |
| 6,269,373 B1 * | 7/2001 | Apte et al. ...................... 707/10 |
| 6,298,391 B1 * | 10/2001 | Kennedy et al. ............. 719/328 |
| 6,418,448 B1 * | 7/2002 | Sarkar ....................... 707/104.1 |
| 6,621,505 B1 * | 9/2003 | Beauchamp et al. ......... 345/764 |

OTHER PUBLICATIONS

BEA Systems, BEA WebLogic Server 5.1 documentation, copyright 2000, pp. 1–114.*

Phillip Merrick et al. Web Interface Definition Language (WIDL), Sep. 1997, pp. 1–15.*

Gregory Duval et al., "Developing Safe Concurrent and Distributed Applications with an Architectural Environment", Computer Networking Laboratory, Conference in Nancy, France, 1999.*

Abdul Sakib Mondal, "XML for B2B automation, client/server style", Infosys Technologies, Ltd., Oct. 2000, pp. 1–2.*

* cited by examiner

Primary Examiner—Diane D. Mizrahi
Assistant Examiner—Apu Mofiz
(74) Attorney, Agent, or Firm—Testa, Hurwitz & Thibeault, LLP

(57) ABSTRACT

A distributed computer application can be made to communicate with a plurality of computer architectures. A first compiler compiles and converts input interface source code to produce a high level language including a plurality of computer architecture interfaces. A second compiler integrates application source code with the converted interface source code to produce the distributed computer application with the plurality of computer architecture interfaces that enable the distributed computer application to communicate with the plurality of computer architectures.

10 Claims, 7 Drawing Sheets

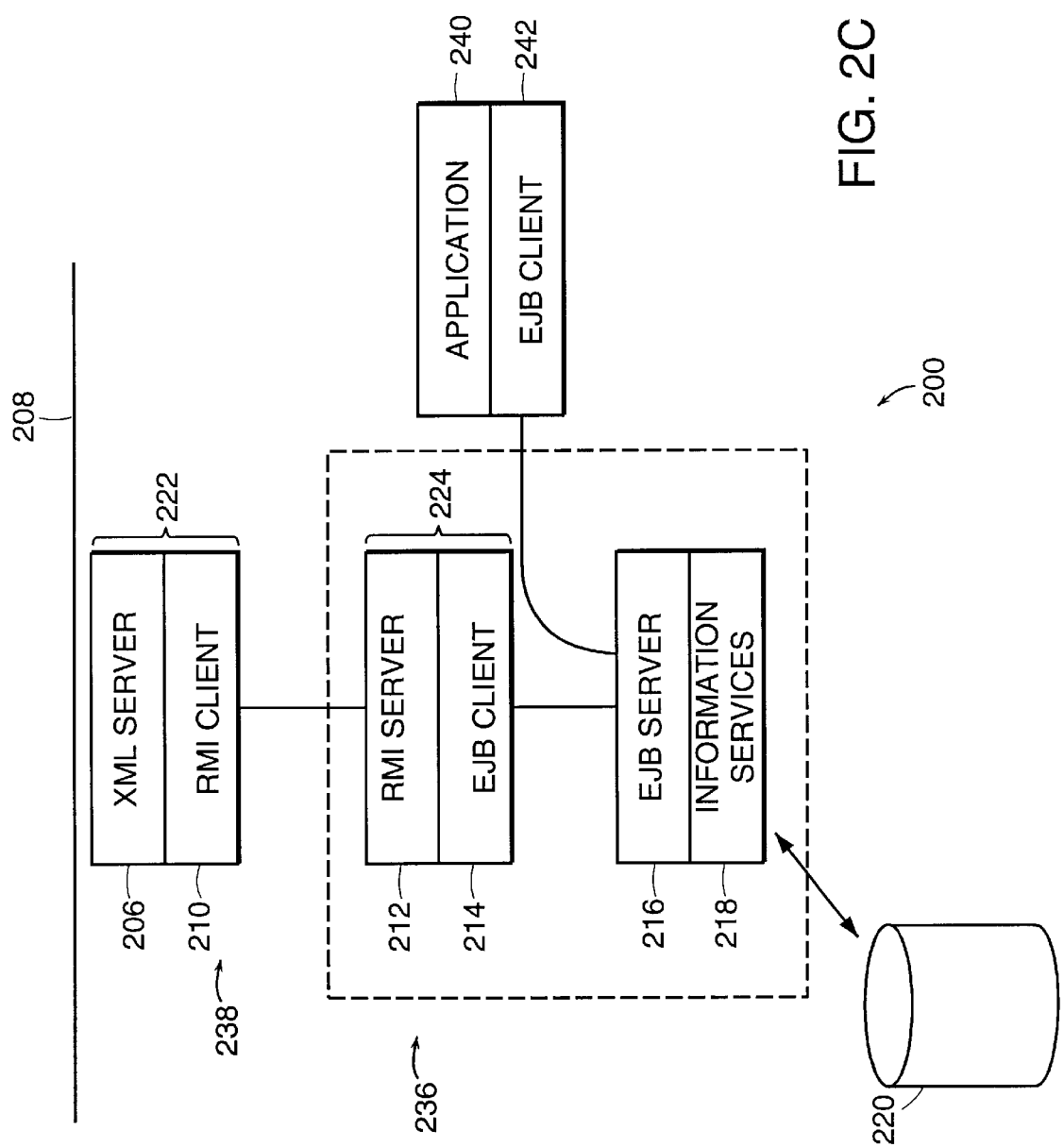

INTERFACE DEFINITION LANGUAGE COMPILER

CROSS REFERENCE TO RELATED CASE

This claims priority to and the benefit of Provisional U.S. Patent Application Serial No. 60/278,812 filed Mar. 26, 2001 and now expired, the entirety of which is hereby incorporated by reference.

TECHNICAL FIELD

The invention relates generally to compilers and more particularly to interface definition language compilers that produce multiple architectural interfaces.

BACKGROUND INFORMATION

Distributed computing is a form of computing in which the processing nodes, or computers, are physically distributed. These computers (clients and servers) are interconnected, and must cooperate in order to maintain some shared state. A distributed computer system can be characterized as a heterogeneous set of hardware, software, and data components; the size and geographical extent of which can vary over a large range. The components are connected by a network and provide a uniform set of services (such as naming, and remote invocation, for example) with certain global properties (such as names, access, and security management, for example).

Distributed objects provide a useful mechanism for client-server communication. The architectures defined for distributed object systems are software frameworks which are required for building and using client/server applications that use distributed objects. Distributed objects are independent pieces of code that can be accessed by local or remote clients via method invocations. Clients can access distributed objects without knowing where the objects reside or what operating system the objects are executed on. The distributed object framework also provides an infrastructure for supporting a large number of services and applications that can spawn any number of transactions. CORBA and JAVA Components (JAVA RMI and JAVA IDL) are two widely used distributed object architectures.

SUMMARY OF THE INVENTION

The invention relates generally to compilers and more particularly to interface definition language compilers that produce multiple interfaces. Distributed applications are currently deployed using a web-enabled configuration such as CORBA, for example. A web-enabled configuration is limited in that services (such as authentication, for example) are duplicated, the network includes only three client/server tiers, and only clients utilizing the same architecture can communicate with the network. The disclosed compiler enables a distributed application to be deployed in a web-centric configuration. In a web-centric configuration, the services are provided by a web server and shared by the entire network, the network is not limited to three tiers (i.e., the network is n-tier), and a client running on any architecture can communicate with the network.

In one aspect, the invention involves a method of producing a plurality of computer architecture interfaces that enable a distributed computer application to communicate with a plurality of computer architectures. The method includes providing source code written in an interface definition language, providing a compiler capable of compiling the source code and producing the plurality of computer architecture interfaces, and setting at least one compiler flag to determine the plurality of computer architecture interfaces that the compiler will produce. The method further comprises compiling the source code to produce the plurality of computer architecture interfaces that enable the distributed computer application to communicate with the plurality of computer architectures.

In another aspect, the invention involves a method of producing a distributed computer application capable of communicating with a plurality of computer architectures. The method includes providing interface source code written in an interface definition language, providing application source code written in a high level language, and providing a first compiler capable of compiling the interface source code, converting the interface source code to the high level language, and producing a plurality of computer architecture interfaces. The method further comprises setting at least one compiler flag to determine the plurality of computer architecture interfaces that the first compiler will produce and compiling the interface source code to convert the interface source code to the high level language. The converted interface source code includes the plurality of computer architecture interfaces. The method still further comprises compiling the application source code and the converted interface source code with a second compiler to integrate the application source code with the converted interface source code to produce the distributed computer application with the plurality of computer architecture interfaces that enable the distributed computer application to communicate with the plurality of computer architectures.

In one embodiment, compiling the application source code further includes producing the distributed computer application to be executable on a plurality of computer architectures.

In another embodiment, compiling the interface source code further includes producing an XML-RMI interface, an XML-EJB interface, or an XML-JNI interface.

In still another embodiment, compiling the interface source code further includes producing at least one of an RMI-EJB interface, an RMI-JNI interface, or an EJB-JNI interface.

In yet another embodiment, the method further comprises deploying the distributed computer application with the plurality of interfaces on a plurality of clients and a plurality of servers to form a network. The method still further includes sharing a plurality of services provided by one of the plurality of servers with the rest of the plurality of servers and the plurality of clients.

In still another aspect, the invention involves a system for allowing a distributed computer application to communicate with a plurality of computer architectures. The system includes a web server and an application server. The web server includes an XML server and a first client. The first client includes a first architecture in communication with the XML server through a first interface. The application server includes a first server which includes the first architecture in communication with the first client. The application server further includes a second client which includes a second architecture in communication with the first server through a second interface. The application server still further includes a second server which includes the second architecture and a plurality of information services. The second server is in communication with the second client and the plurality of information services is accessible by the distributed computer application executing on another client through one of the XML server, the first server, or the second server.

In one embodiment, the first architecture is one of EJB, JNI, and RMI and the second architecture is one of EJB, JNI, or RMI.

In yet another aspect, the invention involves a method of compiling Interface Definition Language (IDL) source code. The method includes examining each of a plurality of elements in the IDL source code which define a particular interface for each of a plurality of desired interfaces and categorizing each of the plurality of elements which define the particular interface for each of the plurality of desired interfaces as one of a factory class, a stateful class, and a stateless class. The method further includes creating a session class for each of the plurality of desired interfaces. Creating the session class includes forming an abstraction around each of a plurality of services for the particular interface to hide the particularities of each of the plurality of services. The method still further includes modifying an application programming interface for each of the plurality of desired interfaces to include the session class.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2C is an illustrative diagram of a distributed object architecture according to still another embodiment of the invention.

DESCRIPTION

Figure 1:
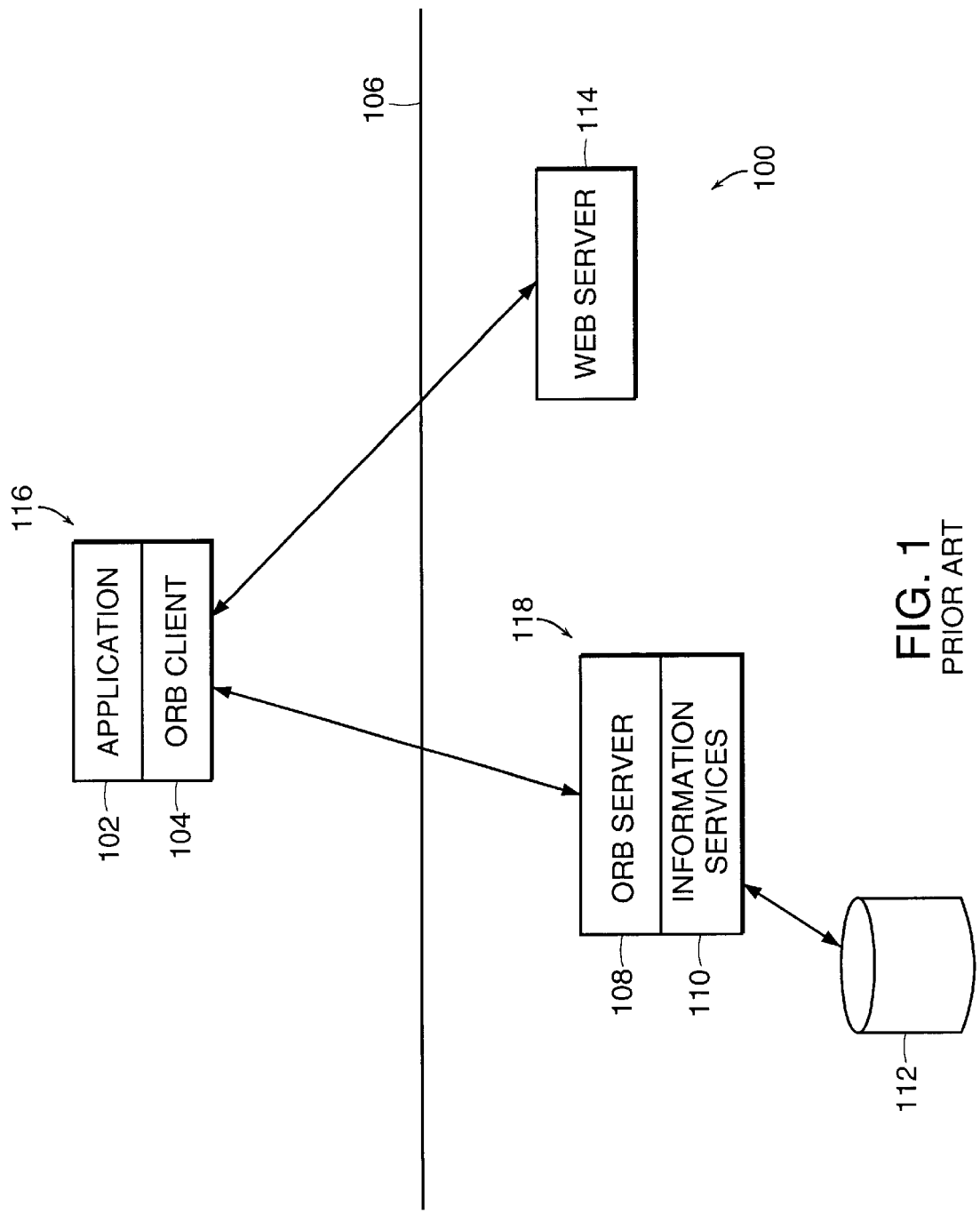
FIG. 1 is an illustrative diagram of a typical Object Request Broker (ORB) distributed object architecture.

Referring to FIG. 1, system 100 is configured as a typical Object Request Broker (ORB) distributed object architecture. The system 100 includes a browser 116 (through which an application 102 implemented as a ORB client 104 can be executed) in communication (through a firewall 106) with an application server 118 implemented as an ORB server 108 (on which information services 110 reside). The application server 118 is also in communication with an application database 112. Additionally, browser 116 is in communication with a web server 114. Known ORB distributed object architectures include CORBA and JAVA IDL.

In the described typical ORB configuration, administrative services must be duplicated on both the application server 118 and the web server 114. For example, both servers 118 and 114 must provide authentication services. A separate directory of users and passwords must be kept on the application server 118 and on the web server 114, and must be kept synchronized. Additional services that must be duplicated include transaction services, naming services, security services, and database administration services. The configuration described above is commonly referred to as "web-enabled" because the application 102, which is deployed over the web, uses different communication channels to communication with server 118 and the server 114.

Applications that are developed using the typical ORB distributed object architecture are divided into three tiers. These tiers include a client tier, a service tier, and data store tier. The client tier is a portion of the distributed application that requests services from the service tier. The data store tier is a portion of the distributed application that manages access to persistent data and its storage mechanisms, such as relational databases. The service tier is a portion of the distributed application that contains business logic and performs computations.

Figure 3:
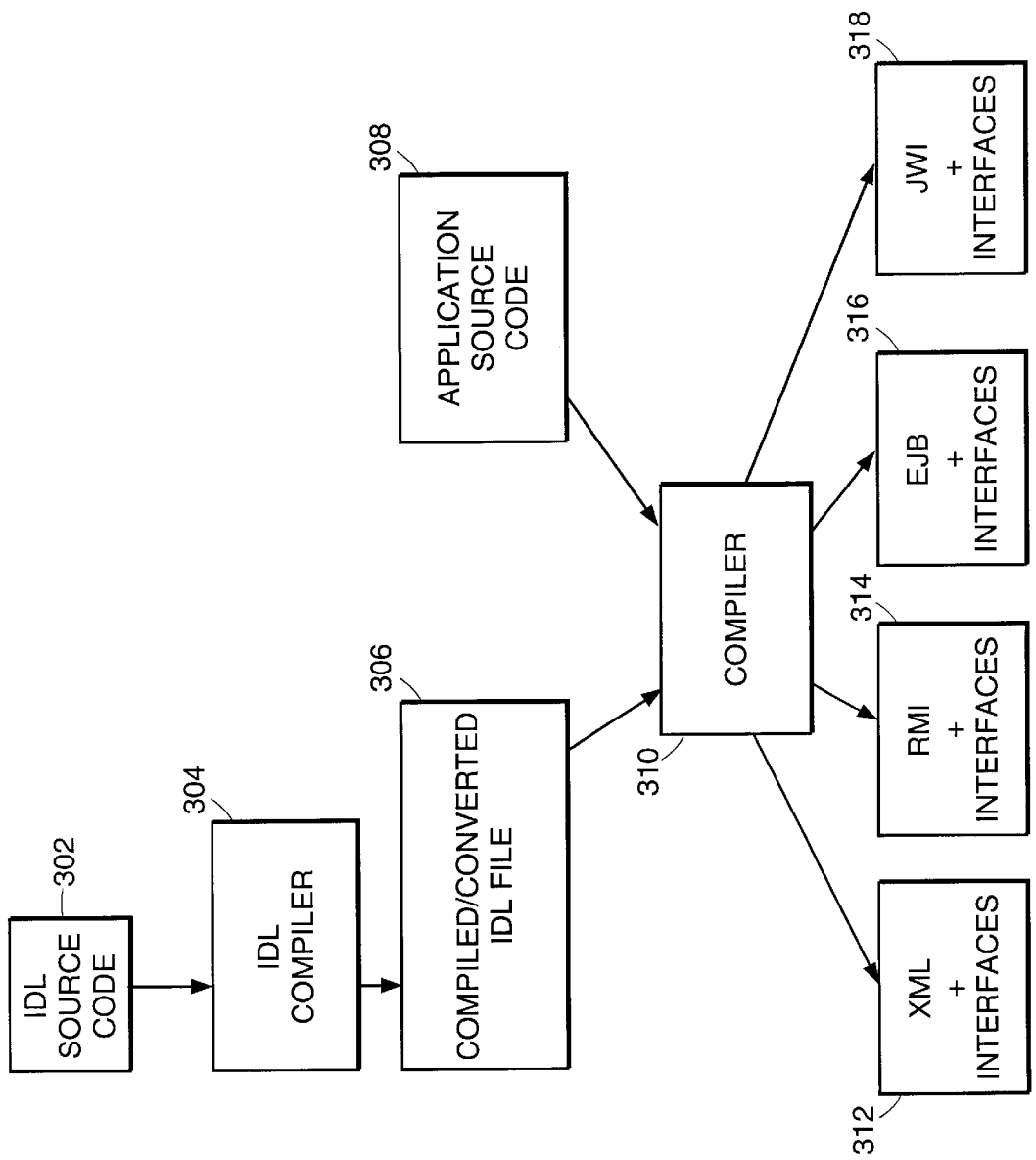
FIG. 3 is an illustrative block diagram of input and output files of a compiler according to one embodiment of the invention.

Referring to FIG. 3, the present invention involves a compiler 304 which compiles and converts an interface source code file 302 (written in an Interface Definition Language or IDL) into another high level language interface source code file 306, such as JAVA or C++, for example. The converted interface source code file 306 includes code for implementing a plurality of architectural interfaces. The interface source code file 306 is integrated with an application source code file 308 by a compiler 310 to produce an n-tier application (as opposed to a 3-tier CORBA-based application, for example) that can be implemented on a variety of web server architectures, such as Extensible Markup Language (XML) 312, Remote Method Invocation (RMI) 314, Enterprise JavaBean (EJB) 316, or Java Native Interface (JNI) 318, for example. Further, the plurality of architectural interfaces produced by this process, allow the application to be accessed from any XML or JAVA-based client.

Figure 2A:
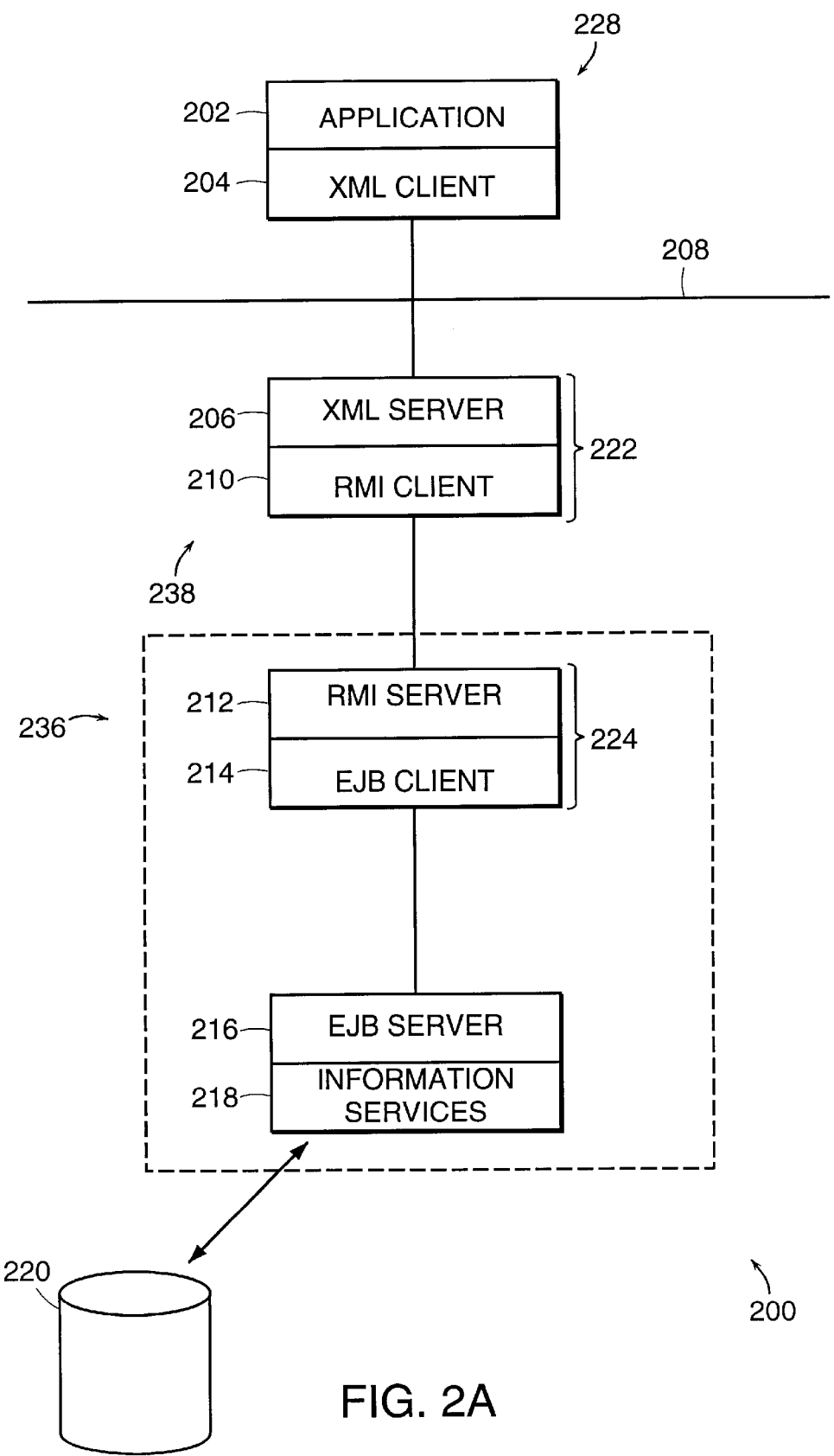
FIG. 2A is an illustrative diagram of a distributed object architecture according to one embodiment of the invention.

Referring to FIG. 2A, system 200 is configured as a distributed object architecture. In one embodiment, the system 200 includes a web browser 228, a web server 238, an application server 236, and an application server database 220. The web browser 228 (through which an application 202 implemented as an XML client 204 can be executed) is in communication (through a firewall 208) with an XML server 206 that resides on the web server 238. The web server 238 also includes an RMI client 210 and an XML-RMI interface 222.

The application server 236 includes an RMI server 212, an EJB client 214, information services 218 (persistence, messaging, life cycle, work flow, policy manager, administration, and structure management) which reside on an EJB server 216, and an RMI-EJB interface 224. The web server 238 communicates with the application server 236 through the XML-RMI interface 222 that resides on the web server 238. The web server 238 further communicates with the information services 218 which reside on the EJB server 216 through the RMI-EJB interface 224. Thus, using the configuration described above, a user (using the application 202 can access the information services 218 on the EJB server 216 from the XML client 204 through the web server 238. The services (authentication, security, transactions, naming, and database administration), which are duplicated in the CORBA-based architecture, are provided by the web server 238 and shared with application server 236. This configuration is commonly referred to as "web-centric". The application 202 is deployed on the web and can fully leverage the services and administration capabilities of the web or application server.

Figure 2B:
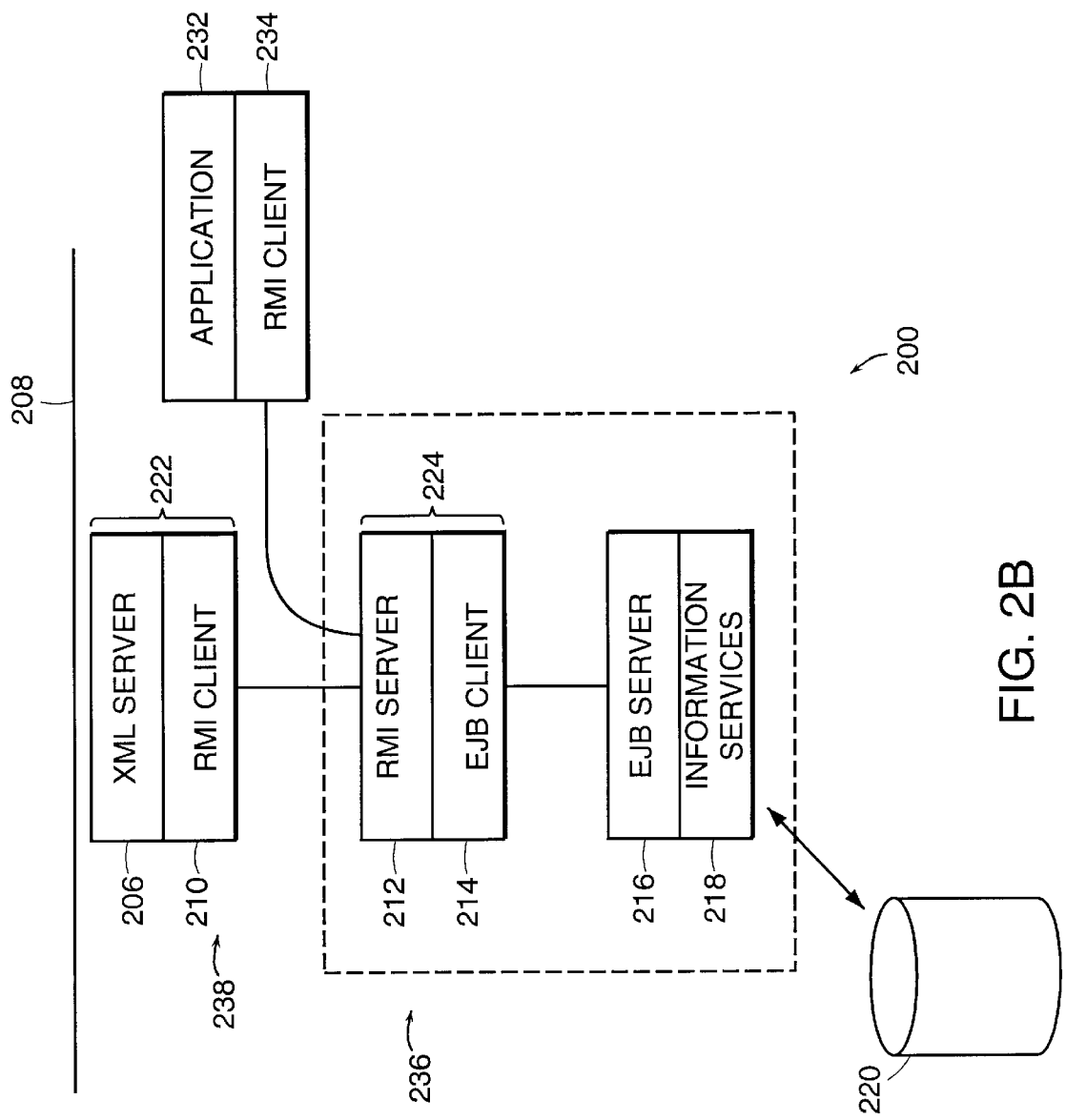
FIG. 2B is an illustrative diagram of a distributed object architecture according to another embodiment of the invention.

Referring to FIGS. 2B and 2C, the information services 218 can be accessed from any point in the network. For example, a user implementing an application 232 on an RMI client 234 from inside the firewall 208 can access the information services 218 on the EJB server 216 from the RMI server 212 through the RMI-EJB interface 224. Likewise, a user implementing an application 240 on an EJB client 242 from inside the firewall 208 can access the information services 218 on the EJB server 216 directly from the EJB server 216. The applications 202, 232, and 240 are the same application implemented on different servers.

The system 200 is not limited to 3-tiers (as with a CORBA-based architecture). Any combination and any number of interfaces (n-tiers) may be stacked on top of one another when building the web server 238 and the application server 236.

Referring again to FIG. 3, in one embodiment, the desired interfaces (EJB-RMI, XML-RMI, RMI-JNI, for example) are selected by setting the appropriate flags prior to compilation by the compiler 304. After the interface file 306 is created, the interface file 306 is integrated with the application source code file 308 and compiled by compiler 310 to run on a particular architecture (XML, EJB, JNI, RMI, for example). The particular architecture is chosen by setting the appropriate flag prior to compilation. The source code 306, and 308 is compiled by compiler 310 for each desired architecture. Thereafter, the same application can be implemented on a particular architecture by selecting the particular architecture at runtime.

Figure 4:
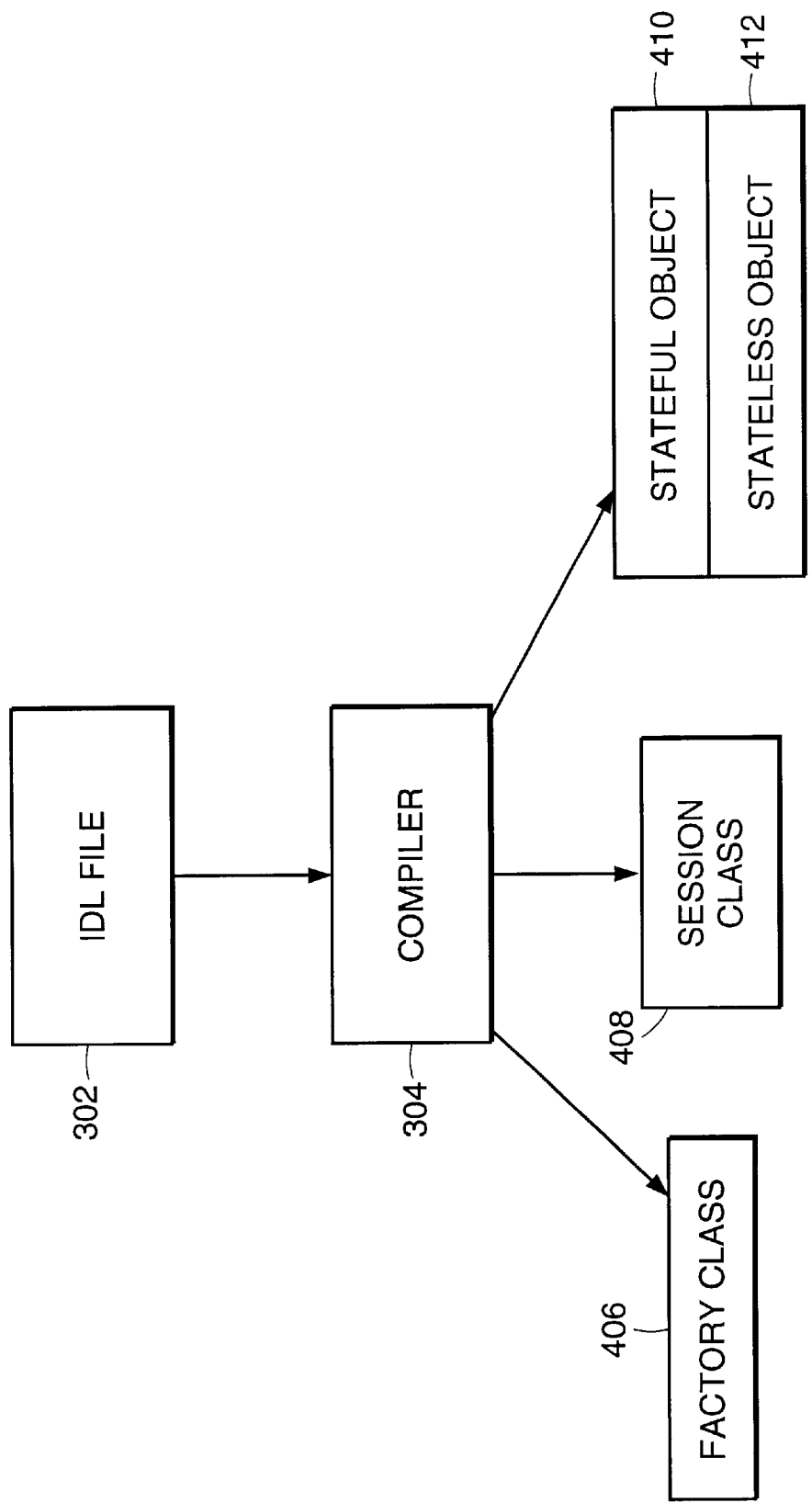
FIG. 4 is an illustrative block diagram of a compilation process according to one embodiment of the invention.
Figure 5:
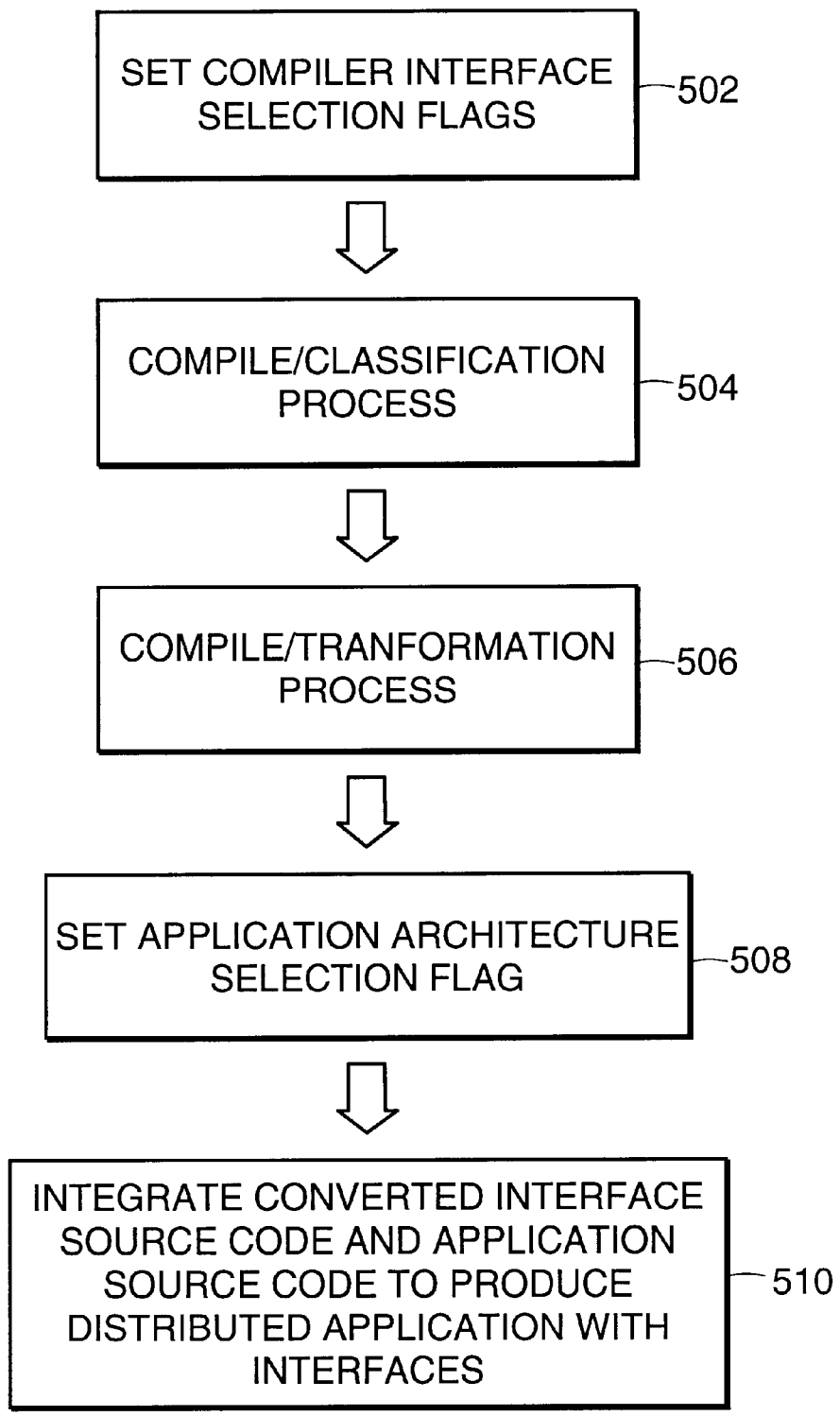
FIG. 5 is a flow diagram illustrating the steps for compiling an application according to one embodiment of the invention.

Referring to FIGS. 4 and 5, in one embodiment, after the flags corresponding to the desired interfaces are set (Step 502), the compiler 304 (when compiling the IDL source file) first engages in a classification process (Step 504). Each element in the interface definition (in the IDL source code file) is examined by the compiler 304 and categorized as a factory class 406, a stateful class 410, or a stateless class 412.

The function of the factory class 406 is to create new objects. The stateful object 410 is a server object that has a lifetime that is managed by an application. The stateless object 412 is a server object that exists only as long as a particular call. The stateless object 412 is a temporary object used for any kind of information service, such as messaging.

The classification process is required to extract information required by architectures (other than CORBA) that is not explicitly available in the IDL file. For example, XML, RMI, and EJB have unique mechanisms for managing the lifetime of objects. To account for the differences in the mechanisms for managing the lifetime of objects, the first step of the interface classification is to determine which methods in the IDL manage object lifetime (construction/destruction) and, using those methods, generate an independent factory class 406. The factory class 406 is then generated differently for each architecture. For an EJB architecture, the factory class 406 is used to generate an EJB Home interface which integrates with the EJB JNDI naming services. For an RMI architecture, the factory class 406 is exposed through the RMI Registry. For an XML architecture, a generated servlet is used to implement the factory class 406.

The differences in these server side implementations of the factory class 406 are hidden from the client application by the session class 408 (discussed below) that is generated for each architecture.

The interface classification process also includes determining whether an object interface is stateful or stateless. Stateful objects 410 are objects which have internal attributes (or "state") which must be maintained on a server for the lifetime of the object. Stateless objects 412 have no internal attributes. CORBA (and the original IDL) does not distinguish between stateful/stateless interfaces. Other environments, particularly EJB, manage stateful objects 410 and stateless objects 412 entirely differently. In an EJB environment, stateful objects 410 are private and owned by a single client. Stateless objects 412 are public and available for use by any client. Stateless objects 412 are typically managed in an object pool which greatly enhances the performance and scalability of a given application. By classifying interfaces as stateful objects 410 or stateless objects 412, the compiler 304 allows an application to be deployed on an EJB server and take full advantage of the optimizations around stateless objects 412.

Next, the compiler 304 performs a transformation process (Step 506). During this process a session class 308 is created. The session class 408 forms an abstraction around each of the services (naming, authentication, security, and transport, for example) for each of the desired interfaces. The application programming interface (API) for each interface is modified to include the session class 408. Creating an abstraction around each of the services hides the particularities of the services that are inherent in each of the different architectures and allows the service to be protocol independent. When a particular service is requested by an application, the request passes transparently from tier to tier and can thereby be shared throughout the network (see FIGS. 2A, 2B, and 2C).

The code produced by the transformation process (Step 506) conforms to a set of predefined abstractions (defined in the IDL source code) which are wrapped around the services available in each client-server architecture. When a client-server architecture does not provide support for a required abstraction, the compiler inserts a suitable component. For example, the XML interface does not provide a naming service. In order for the XML interface to comply with the calling semantics of the RMI, EJB, etc API's, a de-facto naming service for XML is provided by the compiler. Wherever possible, the compiler uses a transformation which complies with the native services available in each architecture's API. The transformation process (Step 506) further modifies the interface defined in the IDL source code to pass session object 308 information from tier to tier.

Referring to FIGS. 3 and 5, in one embodiment, after the transformation process (Step 506) is complete, the compiler 304 outputs a converted interface source code file 306. Next, a particular architecture (on which the application is to be run) is chosen by setting the appropriate flags (Step 508). The converted interface source code file 306 is then integrated with the application source code file 308 by the compiler 310 (Step 510) to produce an n-tier application that can be implemented on a variety of web server architectures, such as XML 312, RMI 314, EJB 316, or JNI 318, for example.

After the compilation process is complete, the code produced by the compiler 310 is deployed on the application server and the web server. The code is deployed to create an n-tier web-centric configuration. Clients, servers, and interfaces can be arranged in any way to suit the needs of the user.

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A method of producing a distributed computer application capable of communicating with a plurality of computer architectures, comprising:

providing interface source code written in an interface definition language;

providing application source code written in a high level language;

providing a first compiler capable of compiling the interface source code, converting the interface source code to the high level language, and producing computer architecture interfaces including at least one of an XML-RMI interface, an XML-EJB interface, and an XML-JNI interface;

setting at least one compiler flag to determine the computer architecture interfaces that the first compiler will produce;

compiling the interface source code to convert the interface source code to the high level language, the converted interface source code having a plurality of computer architecture interfaces including at least one of the XML-RMI interface, the XML-EJB interface, and the XML-JNI interface; and compiling the application source code and the converted interface source code with a second compiler to integrate the application source code with the converted interface source code to produce the distributed computer application with the plurality of computer architecture interfaces that enable the distributed computer application to communicate with the plurality of computer architectures.

2. The method of claim 1, wherein compiling the application source code further comprises producing the distributed computer application to be executable on a plurality of computer architectures.

3. The method of claim 1, wherein compiling the interface source code further comprises producing at least one of an RMI-EJB interface, an RMI-JNI interface, and an EJB-JNI interface.

4. The method of claim 1, further comprising executing a classification process whereby elements in the interface source code are categorized into classes.

5. The method of claim 1, further comprising deploying the distributed computer application with the plurality of computer architecture interfaces on a computing system having a plurality of clients and a plurality of servers.

6. The method of claim 5, further comprising sharing a plurality of services provided by one of a plurality of servers with the rest of the plurality of servers and a plurality of clients.

7. The method of claim 5, further comprising sharing a service provided by one of the servers with the rest of the servers and the clients.

8. The method of claim 1, wherein compiling the application source code further comprises producing the distributed computer application to be executable on a first computer architecture, a second computer architecture, and a third computer architecture.

9. The method of claim 1, wherein compiling the interface source code further comprises producing an RMI-EJB interface and an RMI-JNI interface.

10. The method of claim 1, further comprising categorizing an element in the interface source code into a class.

* * * * *